Oct. 16, 1962 J. A. MULLER 3,058,493
FLEXIBLE REINFORCED CORRUGATED HOSE
Filed Feb. 11, 1959 3 Sheets-Sheet 1
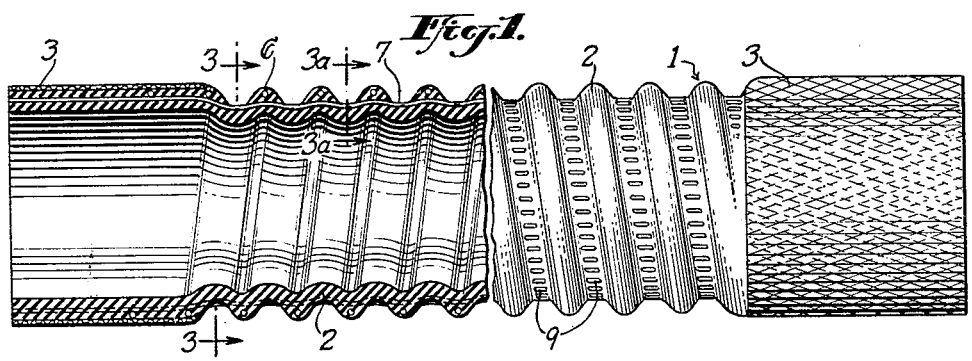
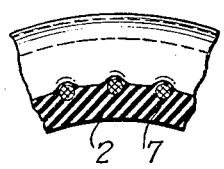
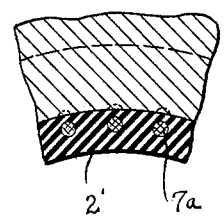
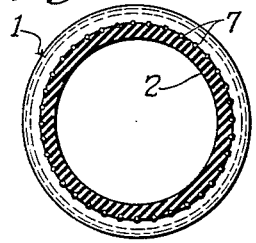
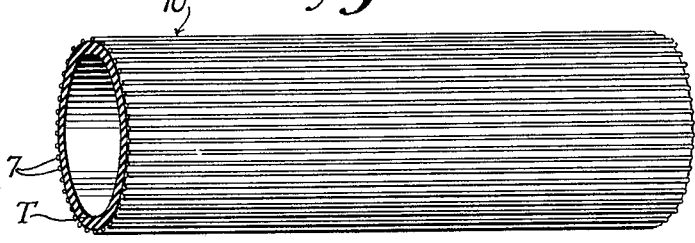
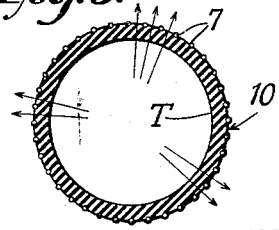
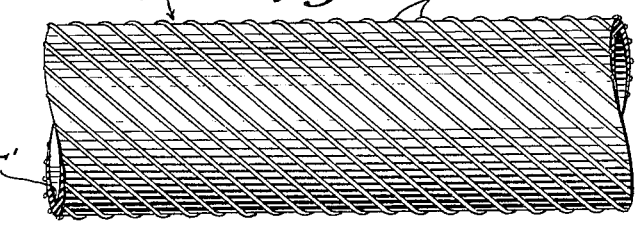
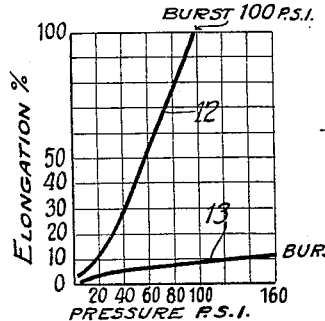
INVENTOR.
JOHN A. MULLER.
BY
Ward, Neal, Haselton, Orme & McElhannon
ATTORNEYS.

Oct. 16, 1962 J. A. MULLER 3,058,493
FLEXIBLE REINFORCED CORRUGATED HOSE
Filed Feb. 11, 1959 3 Sheets-Sheet 2
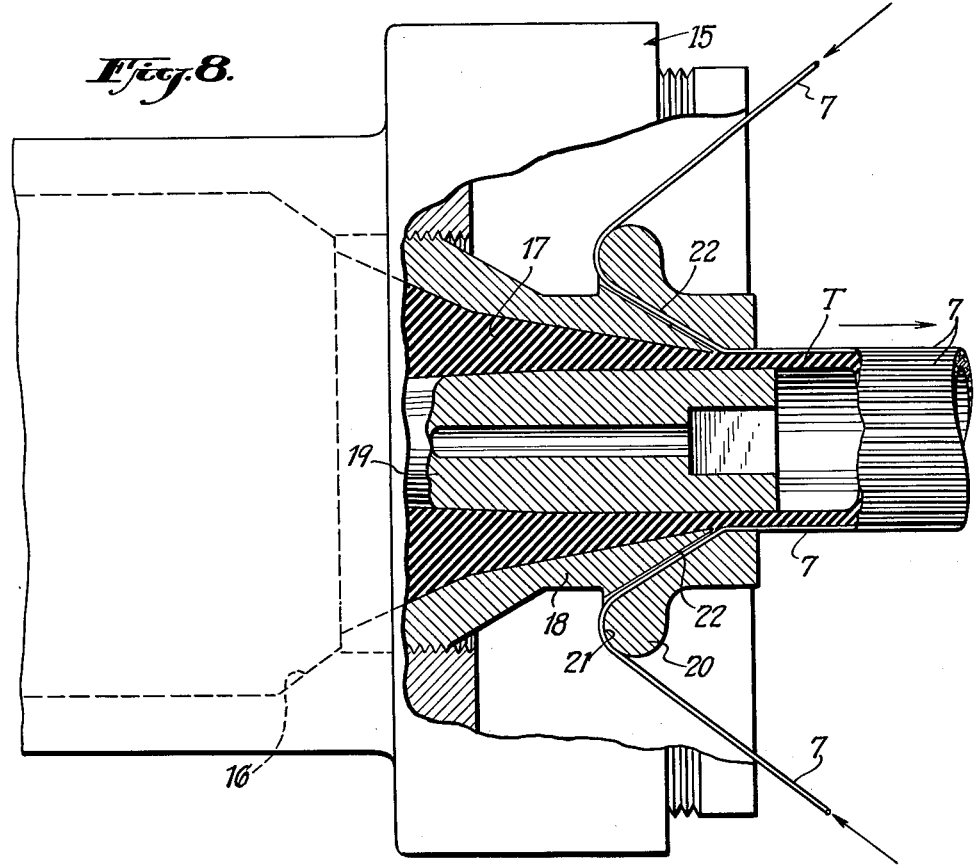
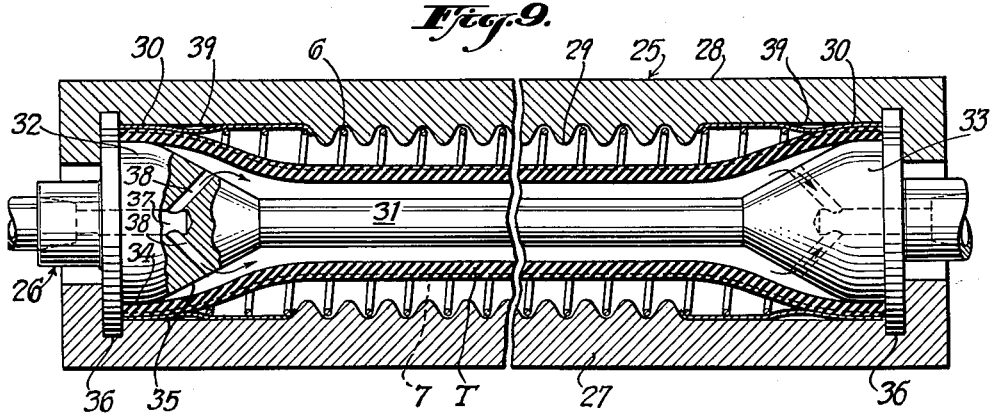
INVENTOR.
JOHN A. MULLER.
BY
Ward, Neal, Haselton, Orme & McClannon
ATTORNEYS.

Oct. 16, 1962 J. A. MULLER 3,058,493
FLEXIBLE REINFORCED CORRUGATED HOSE
Filed Feb. 11, 1959 3 Sheets-Sheet 3
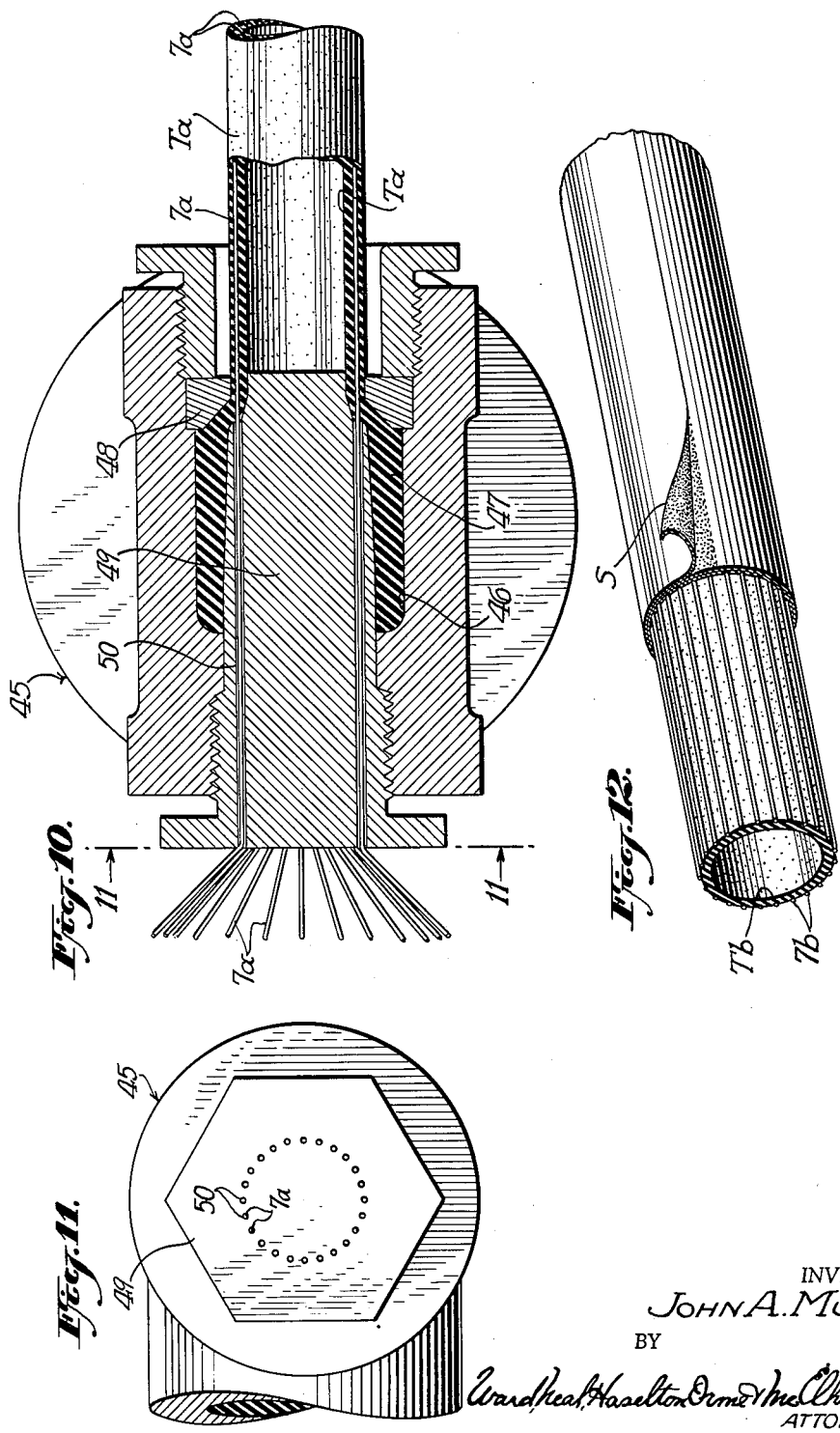
INVENTOR.
JOHN A. MULLER.
BY
ATTORNEYS.

United States Patent Office 3,058,493
Patented Oct. 16, 1962

3,058,493
FLEXIBLE REINFORCED CORRUGATED HOSE
John A. Muller, Princeton, N.J., assignor to H. K. Porter Company, Inc., Trenton, N.J., a corporation of Delaware
Filed Feb. 11, 1959, Ser. No. 792,556
8 Claims. (Cl. 138—122)

This invention relates to molded flexible reinforced hose and more particularly to flexible hose having a tubular wall section corrugated interiorly and exteriorly and reinforced against radial and longitudinal stresses.

The subject matter disclosed herein and not claimed forms the subject matter of my copending application Serial No. 182,768, filed March 27, 1962.

Heretofore molded flexible corrugated hose have been made having solid reinforcing external ridges and wire reinforcing means encircling the hose and embedded in the crests of the external ridges. Such hose provide many advantages and, among others, the economies available due to the efficient method of manufacture.

The present invention is an improvement thereover.

While such hose has been widely used and is adequate for many purposes, it has been found highly desirable to reinforce such a hose longitudinally. It has been attempted to incorporate an overall fabric reinforcement. Where helical wire reinforcement is used such fabric reinforcement has been attempted, either under the helix or over the helix. In the first case when the fabric is placed under the helix it restricts the expansion of the combined underassembly of tube and fabric into the mold convolutions with the result that an imperfect product is produced. Even when open weave fabrics or stockinets have been used under the helix of wire, it is only with great difficulty that the moldable plastic composition can bleed through the interstices of the weave and subsequently expand into the mold convolutions and hence such procedure is too undependable to rely upon in commercial production, since too high a percentage of imperfect products would result. On the other hand, when the fabric is placed over the wire helix the line of fabric as it crosses from one turn of the helix to the other interferes with the respective mold convolutions and distortion and pinching of the fabric occurs, resulting again in an imperfect product. Additionally, when fabric or stockinet is placed over the wire it follows the general contour of external corrugations and tends to extend like an accordion when the hose is stressed axially, and permits undue elongation.

While the helical wire in combination with the helical corrugation (as used in known prior hose) suffices for bending support and a substantial degree of resistance to lateral or radial expansion, there is no support between the helical turns of wire and the intervening valleys are inherently weak. Such a hose develops excessive increase in length and distortion when subjected to substantial internal pressure. This distortion in turn creates strains in the hose which therefore develops low resistance to internal pressure and fails when subjetced to fairly high internal pressure.

Therefore, the previously known hose structures involve on the one hand a hose structure reinforced against radial stresses only, which produces a structure deficient in its ability to withstand substantial internal pressure without lengthwise elongation and distortion and requiring expensive high grade material to prevent rupture even at relatively lower pressures; and on the other hand a fabric reinforced structure which is not entirely satisfactory and additionally is not receptive to molding by internal blowing without serious manufacturing hazards, to say nothing of the additional expense for material and labor. This invention provides a hose and method of manufacture which overcomes the above-mentioned difficulties from a structural, operational and cost point of view.

According to one aspect of this invention, a flexible hose is provided which comprises an interiorly and exteriorly corrugated tube of plastic material and generally longitudinally extending individual reinforcing cords embedded in the tube.

According to another aspect of the invention, such a tube is manufactured by forming a tubular blank having circumferentially spaced longitudinally extending individual reinforcing cords, placing the tubular blank in a suitably corrugated mold, heating and expanding the tubular blank and forming it to the interior of the mold and curing the thus formed hose.

The invention consists in the novel features, arrangement and construction provided by way of example in the products hereinafter described and in the methods and apparatus hereinafter described for producing said products, as illustrating representative preferred forms of the invention, and the invention will be more particularly pointed out in the appended claims.

Further objects, features and advantages of the invention will more fully appear from the following description taken in conjunction with the accompanying drawings, in which:

FIG. 1 is a side elevational view of an automobile radiator hose illustrating an embodiment of the invention, with portions broken away to better illustrate the structural details;

FIG. 2 is a longitudinal sectional view of an enlarged segment of the corrugated wall section of the hose shown in FIG. 1;

FIG. 3 is a cross-sectional view taken at line 3—3 of FIG. 1;

FIG. 3a is an enlarged cross-sectional view taken at line 3a—3a of FIG. 1;

FIG. 3b is a view similar to FIG. 3a but showing the reinforcing cords more deeply embedded;

FIG. 4 is an elevational view of an uncured tubular blank made in accordance with my invention and utilized in the molding of the hose shown in FIG. 1;

FIG. 5 is an end elevational view of the tubular blank shown in FIG. 4 to better illustrate one of the steps in practicing my invention;

FIG. 6 is a side elevational view of a modified form of an uncured tubular blank which may be utilized in place of the blank shown in FIG. 4;

FIG. 7 is a graph showing elongation and resistance to pressure of a hose made according to my invention as compared to the prior art hose of the same general character;

FIG. 8 is a partial sectional view showing the salient features of an extrusion head especially adapted for producing the tubular blank shown in FIG. 4;

FIG. 9 is a longitudinal sectional view of a mold assembly with an uncured tubular blank such as FIG. 4 mounted therein in position to be formed into the hose shown in FIG. 1;

FIG. 10 is a partial sectional view showing the salient features of a modified form of extrusion head for producing a modified form of tubular blank;

FIG. 11 is a rear end elevational view of the extrusion device shown in FIG. 10; and FIG. 12 shows a further modified form of tubular blank.

The unique product embodying my invention will first be described and thereafter the method and apparatus for making the same will be described.

Referring more particularly to FIG. 1, a hose made in accordance with the invention is designated in general as 1 and comprises an interiorly and exteriorly corrugated wall portion 2 and substantially cylindrical fastening end portions such as 3. The exterior corrugations are defined (FIG. 2) by solid ridges 4 and intervening valleys 5. The hose is made from suitable plastic material, preferably elastomeric material. The wall portion 2 has embedded in the solid ridges 4 of the hose circumferential reinforcement means, such for example as the helical wire spring 6 which is substantially entirely covered by said plastic material, and also is provided with a multitude of longitudinally extending circumferentially spaced individual cords such as 7. In the present embodiment where the hose 1 is 1½" inside diameter, 36 rayon cords are used, substantially equally spaced 10° apart, each being 1650/2 ply x 2 having a diameter of about 0.022". Of course when the hose is of a different diameter the number of cords and the angular spacing will vary. For example, on a 1¼" hose 30 cords are used and for each change of ¼" in the inside diameter of the finished hose there is a change of 6 cords, e.g., a 1" hose would have 30 minus 6, or 24 cords.

In hose made in accordance with my invention I have utilized both neoprene compositions and natural rubber compositions, but it is within the contemplation of the invention that other suitable moldable plastics may be employed. The term "elastomeric material" is to be taken in its broadest sense as meaning material having the properties of natural, reclaimed, vulcanized or synthetic rubber, as well as resins or the like material which may be extruded and molded under heat and pressure, including by way of example but not by way of limitation, polyethylene, polyamides, vinyl polymers, copolymers and the like. Said material being chosen to meet the characteristics desired in the finished hose and to meet the further requirement that the material, after it has been partially or fully set, either by means of vulcanizing or cooling, will retain its shape during use for its intended purpose and will be flexible.

It is especially noted that the individual cords such as 7 are disposed within (beneath) the helical reinforcing wire 6 spaced a substantial radial distance inwardly therefrom and spaced somewhat above the inner surface of the interior valleys 8. It is of further importance that the cords such as 7 traverse the corrugations close to the outer surface of the hose adjacent the exterior valleys 5 thereof (FIG. 2) and that the undulations of the cords be maintained at a minimum so that they may be placed in stress when axial loads are applied to the hose, rather than merely straightening out as would be the case if they followed paths of substantial undulation.

As will be explained more fully hereinafter, the depth that the cords 7 are embedded in the moldable plastic material adjacent the valleys 5 may be somewhat varied according to the procedure followed and the manner in which the preliminary tubular blanks are formed. In the embodiment shown in FIG. 1, for example, the cords, where they cross the exterior valleys, extend to and partially project above the outer surface as indicated at 9 in FIG. 1 and as somewhat more clearly shown in FIG. 3a; while in FIG. 3b a modification is shown in which the cords are more deeply embedded so as to be entirely covered at the exterior valleys as indicated.

From the foregoing it will be seen that I have been able to greatly improve the hose of the prior art having substantially solid ribs or ridges and reinforcing wire, which jointly provide reinforcement against radial pressure, by adding thereto efficient and effective means in the form of cords for taking the axial pressure forces. The longitudinal reinforcing means and the transverse reinforcing means supplement and cooperate each with the other to produce a greatly improved product.

Referring more particularly to FIG. 7, the results of comparative tests are shown by curves plotted between percentage of elongation and internal pressure per square inch. Curve 12 shows the results of tests conducted on a hose made in accordance with the said Caplan co-pending application and having the solid reinforcing ribs 4 and the helical reinforcing wire 6 as above pointed out with reference to FIGS. 1 and 2 but having no longitudinal reinforcing means. Curve 13 shows the results of the test of a hose embodying this invention as above described with reference to FIGS. 1 and 2, in all respects comparable to that represented by curve 12, except for the incorporation in said hose of the longitudinally extending cords constructed and arranged as above described with reference to FIGS. 1 and 2, etc.

As will be seen from curve 12 of the chart (FIG. 7), a hose made in accordance with the prior practice and having the wire helix reinforcement embedded in the solid ribs as shown in FIG. 2 but lacking the reinforcing cords 7, elongated 15% at a nominal working pressure of 25 p.s.i. with progressive additional increase in length and stress growth until it elongated 100% under a pressure of 100 p.s.i., at which point the hose burst; whereas from curve 13 it will be seen that a comparable hose made according to this invention reinforced by the longitudinally extending rayon cords, as above described with reference to FIG. 2, elongated only 5% at the same nominal working pressure of 25 p.s.i. with no perceptible additional increase in length or stress growth and elongated only 10% up to the bursting point of 160 p.s.i.

In addition to the benefits derived from the structure of the hose made in accordance with this invention, such hose is adapted to be made economically and readily produced by the pressure molding method.

In the present embodiment the tubular blank designated generally as 10 in FIG. 4 comprises an extruded uncured neoprene tube T having slightly embedded in its outer surface a multitude of the individual cords 7, in the present embodiment 36 of such cords being employed. The cords in this embodiment extend substantially parallel to the axis of the tube and are equally spaced apart circumferentially and are substantially equidistant from the central axis. The cords in the instant embodiment being 1650/2 ply x 2 rayon; but of course it will be obvious to those skilled in the art that such cords may vary in size and may also be made of nylon or cotton or other natural or synthetic fibers or combinations of such fibers. For practical purposes such cords should be spaced apart a distance preferably greater than the cord diameter and at least as great as the cord diameter to permit the proper slot-like passage between the cords of the plastic material, as indicated by the arrows in FIG. 5 and as will be more fully discussed hereinafter. Instead of the cords extending in parallel relation to the axis and being partially embedded as indicated in FIGS. 4 and 5, the cords may be secured against the outer surface of the uncured tube T by any suitable means such as an adhesive, and may be wound around the tube helically as illustrated in FIG. 6, in which the tubular blank is designated in general as 11, the tube as T' and the cords as 7'. I have found that in such case the cord should make an angle of not more than about 20° with the axis of the tube.

Referring to FIG. 8, reference will be made to the apparatus and method presently used for producing tubular blanks as shown in FIG. 4.

In general, the apparatus used for making the tubular blank T with the cords 7 embedded therein is in large part a conventional extrusion machine, sometimes referred to as a "tuber," and only such parts of said machine which have been specially designed in accordance with my invention will be described. The extrusion head of the machine is identified in general as 15 having a pressure chamber 16 serving to confine and guide the heated plastic composition 17 through the extrusion nozzle comprising a ring 18 and pin 19, as is generally customary. The ring 18 in this instance is especially constructed and arranged in accordance with the present invention for guiding the cords 7 in circumferentially spaced relationship and for proper radial distance from the axis so as to be partially embedded in the tubular blank T being extruded in the annular outlet orifice formed between the die ring 18 and die pin 19. The ring 18 is provided with a cord guiding lip 20 concentric with the extrusion nozzle and having a rounded cross section providing a surved surface 21 of about ¼" radius over which the cords 7 freely pass. The ring is provided with holes such as 22 tangential to the radius 21 and extending inwardly and forwardly to the interior of the nozzle at a point slightly rearwardly of its mouth, said holes 22 being spaced 10° apart so as to provide for the 36 cords in the embodiment above referred to. In general the space between the cords should not be less than and preferably somewhat greater than the cord diameter. Cords 7 are threaded through the respective holes 22 and as the plastic material 17 is extruded out through the die head the cords are partially embedded in the surface of the uncured tubular blank T in parallel relationship as shown. The cords 7 are fed to the die ring from a suitable supply source, such a spools or bobbins held on a creel (not shown). The extruded tubular blank T with the cords 7 embedded therein is cut into suitable lengths to be pressure molded in the manner referred to more particularly below. While it is presently considered preferable to introduce the cords simultaneously with the extrusion operation as above described, it is possible to first extrude the tube and thereafter by separate operation pass the extruded tube through a known serving head by which the cords are spiralled around the outer surface of the tube and adhesively secured thereto at any pitch which may be desired, to thereby produce a tube such as that illustrated in FIG. 6. Suitable apparatus for adhesively applying cords in spaced spiral relation about a tube is disclosed in my Patent No. 2,093,206, issued September 14, 1937.

I have found that the peripheral spacing of the individual cords on the tubular blank in the manner above described, whereby open slots are provided between the cords, makes its possible to readily form the hose in accordance with my invention by making use of pressure molding procedure. In FIG. 9 I have somewhat schematically shown apparatus suitable for the carrying out of said pressure molding and since the molding apparatus is not claimed herein per se, it will only be described in sufficient detail to illustrate the practice of applicant's invention. The mold assembly is designated in general as 25 and the mandrel which is used in conjunction with the mold is designated in general as 26. The mold 25 is hollow and is split longitudinally to provide two separable sections comprising a lower section 27 and an upper section 28. The interior wall of the mold is provided with a corrugated intermediate section 29, for providing the corrugated tubular wall 2 of the hose (FIG. 1), disposed between cylindrical portions such as 30 for forming the cylindrical attaching ends 3 of the finished hose 1 illustrated in FIG. 1.

The mandrel 26 comprises a central tubular portion 31 and enlarged end portions 32 and 33 each having a cylindrical portion such as 34 cooperatively disposed opposite to and concentric with the cylindical portions of the mold cavity such as 30. The end portions 32 and 33 are also each provided with a conical portion such as 35 and with a radially extending flange such as 36. At least one of the ends 32, 33 is readily detachable from the tubular portion 31 to permit placing thereover of the uncured blank T having cords 7 embedded therein as previously described. After the tube T is placed over the mandrel 26 the helical wire reinforcing means 6 is inserted over the blank T. The tubular blank T is somewhat stretched onto the cylindrical portions 34 of the enlarged ends 32 and 33 in such position as to be clamped between the mandrel ends and the mold 25, with the ends of the tube T abutting against the flanges such as 36 and in such position serves to seal off the interior of the plastic tube from the surrounding mold interior. After the blank has been placed in position on the mandrel, reinforcing fabric strips such as 39 preferably are disposed around the end portions of the tube T and overlapping the end turns of the wire helix 6. The parts thus assembled on the mandrel are placed within the mold 25 with the turns of the wire helix 6 in register with the corrugated grooves of the mold cavity and the fabric strips 39 and the end portions of the wire helix 6 surrounded thereby are disposed within the cylindrical portions of the mold cavity such as 30. The flanges such as 36 are seated in cooperating cavities provided in the mold 25 thus serving to resist any tendency of the mandrel sections to separate in an axial direction. The mandrel is provided with inlet and outlet passages for passing pressure fluid interiorly of the tubular blank T. Such inlet and outlet passages are suitably provided with short axial bores such as 37 and ports such as 38 which are provided in each of the enlarged ends 32, 33.

With the parts thus disposed and with the mold 25 suitably held and heated, fluid pressure such as steam is introduced into the interior of the tube T and the tube T under heat and pressure is expanded outwardly and caused to conform to the interior mold cavity. It is especially noted at this point that the plastic material is permitted to flow through the slot-like spaces provided between the individual cords 7 throughout their length as graphically indicated in FIG. 5 by the arrows, thus enabling the rubber to flow into the mold corrugations and around the wire helix 6 to thereby produce the corrugated wall, as better illustrated in FIG. 2. As above noted, it is desirable to have the cords 7 approach a straight line or have relatively limited undulations, and it has been found that this condition can be improved by keeping the cords 7 under tension as they are fed through the extrusion machine above described in connection with FIG. 8. The product illustrated and described in connection with FIG. 1 results from the above molding procedure using the special tubular blank T having the cords 7 disposed thereabout.

While optimum results are obtained when the longitudinal reinforcing cords are used in combination with both the solid reinforcing beads such as 4 (FIGS. 1 and 2) and the wire reinforcement such as 6, it has been found that the longitudinal reinforcing cords in combination with the solid bead reinforcement from which the wire 6 has been omitted provides a useful hose for certain purposes, such as where the hose is not subjected to bending forces.

Referring to FIGS. 10–12, modified forms of tubular blanks having the longitudinally extending cords embedded more deeply in the moldable plastic material, and the method of making the same, will be described. In FIG. 10, a side delivery extrusion head is designated in general as 45 having a pressure chamber 46 for supplying plastic material such as neoprene 47 to an extrusion nozzle comprising a die ring 48 and a core pin 49. This extrusion head forms a part of a conventional extrusion machine and differs therefrom primarily only in the special arrangement of the core pin 49 now to be described. The pin 49 is provided with a plurality of holes or passages such as 50 concentrically disposed about its axis in circumferentially spaced relation and extending from the rear end of the core pin 49 longitudinally thereof in parallel relationship and disposed in a circular pattern with the cords equidistant from the nozzle axis so as to deliver cords such as 7a passing therethrough into the annular orifice spaced inwardly from the inner diameter of the die ring 48. Thus, as the tubular blank Ta is extruded in plastic state the cords 7a will be embedded in the wall thereof and spaced inwardly of the outer surface of the tube. Accordingly, when a tube such as Ta is molded as above described with reference to FIG. 9, the resulting hose will have the cords 7a buried below the surface of the exterior valleys in the corrugated tubular wall portion 2' (FIG. 3b), which will improve the degree of protection of the cords from external influences and somewhat improve the appearance of the hose. The hose in all other respects will be the same as that described in FIGS. 1 and 2 and will present the same benefits. The particular embodiment shown in FIG. 11 is adapted for producing a hose of about 1" in diameter and in such embodiment there are 24 holes or passages 50 provided for receiving a like number of cords 7a.

A further modified form of tubular blank is shown in FIG. 12 in which a tube Tb is provided on its outer surface with cords 7b resulting from extrusion such as above described with reference to FIGS. 4 and 8. The tube thus prepared is enveloped or wrapped with a thin layer or sheet S of compatible moldable plastic material such as neoprene or rubber. This outer layer embeds the cords beneath the surface with a result similar to the tube Ta (FIG. 10), adding to the protection of the cords and enhancing the appearance of the finished hose. Similarly a tubular blank such as 11 (FIG. 6) having spirally disposed cords may be enveloped or wrapped with a thin layer of material to fully embed the cords beneath the surface.

A further advantage of this modified tubular blank is that the extruded tube can be made with the use of relatively cheap material and higher quality material can be used for the outer surface sheet S; thus providing a substantial economic advantage. A further advantage is that a variety of colored material can be used for the outer wrapping sheet S, either as a means of sales appeal or to identify hose for a given use. In this connection it is noted that it is more practical from a manufacturing point of view to produce bright colors in a calendering machine on which said sheet S may be made than it is to extrude a tubular blank by the use of color stock.

Having thus described my invention with particularity with reference to certain presently preferred forms of the products and methods of and apparatus for producing the same, and having referred to some of the possible modifications of the invention, it will be obvious to those skilled in the art after understanding the invention, that other changes and modifications may be made therein without department from the scope of the invention, and it is my intention to cover in the appended claims such changes as come within the scope of the invention.

What I claim is:

1. A flexible hose comprising an interiorly and exteriorly corrugated tube of elastomeric plastic material, wire reinforcing means encircling said tube and substantially wholly embedded in the crests of the corrugations of said tube, and a plurality of circumferentially spaced generally longitudinally extending individual reinforcing cords embedded in the plastic material of said tube entirely beneath said wire reinforcing means and disposed radially outwardly from the inner surface of said tube.

2. A flexible hose as set forth in claim 1 wherein the reinforcing cords extend substantially straight.

3. A flexible hose comprising an interiorly and exteriorly corrugated tubular wall of plastic material, the exterior comprising crests and intervening valleys, wire reinforcing means encircling said tube and embedded in said crests and a multiplicity of individual reinforcing cords generally longitudinally extending circumferentially spaced and embedded in said wall beneath said wire reinforcing means, said reinforcing cords being in close proximity to the outer surface of the hose adjacent said valleys and remote therefrom adjacent to crests of the corrugations.

4. A flexible hose as set forth in claim 3 in which the cords in their longitudinal extent follow a path having an angle with the axis of the hose of from 0 to 20°.

5. A flexible hose as set forth in claim 3 in which the reinforcing cords are disposed entirely beneath the outer surface of the hose and are completely covered by said plastic material at said valleys.

6. In a flexible hose comprising an interiorly and exteriorly corrugated tubular body wall of plastic material, the exterior corrugations being defined by ridges and intervening valleys, said ridges being solid throughout at least the major portion of their extent between said valleys, and wire reinforcing means encircling said body and embedded in the crests of said ridges, the combination with said tubular body wall and wire reinforcing means of a multiplicity of individual reinforcing cords spaced apart circumferentially and extending longitudinally of said hose, throughout the length thereof, said cords being disposed beneath said wire reinforcing means completely embedded in said solid ridges and extending across the intervening valleys immediately adjacent the exterior surface thereof.

7. A flexible hose comprising an interiorly and exteriorly corrugated tube of plastic material, the exterior comprising solid ridges and intervening valleys and a multiplicity of generally longitudinally extending circumferentially spaced individual reinforcing cords embedded in said tube, said reinforcing cords being relatively closer to the outer surface of the tube adjacent the exterior valleys of the corrugations and extending through said ridges relatively closer to the inner surface of the tube beneath the ridges.

8. A flexible hose comprising an interiorly and exteriorly corrugated tube of plastic material, the exterior comprising solid ridges and intervening valleys and a multiplicity of generally longitudinally extending circumferentially spaced individual reinforcing cords embedded in said tube, said reinforcing cords being embedded in the outer surface of the tube at the valleys of the corrugations and being remote from the outer surface of the tube adjacent the crests of the corrugations.

References Cited in the file of this patent

UNITED STATES PATENTS

| | | |
|---|---|---|
| 1,911,570 | Holstein | May 30, 1933 |
| 2,448,485 | Chernack | Aug. 31, 1948 |
| 2,501,690 | Prendergast | Mar. 28, 1950 |
| 2,687,553 | Colombo | Aug. 31, 1954 |
| 2,707,491 | Harris | May 3, 1955 |
| 2,715,914 | Roberts | Aug. 23, 1955 |
| 2,739,616 | Duff | Mar. 27, 1956 |
| 2,891,581 | Roberts | June 23, 1959 |
| 2,901,024 | Marsden | Aug. 25, 1959 |
| 2,936,812 | Roberts | May 17, 1960 |

FOREIGN PATENTS

| | | |
|---|---|---|
| 719,638 | Great Britain | Dec. 8, 1954 |